(12) United States Patent
Taylor

(10) Patent No.: US 7,324,745 B1
(45) Date of Patent: Jan. 29, 2008

(54) SEAT TRIM HEATER

(76) Inventor: Thomas D. Taylor, 1780 Pelton Rd., Fostoria, OH (US) 44830

( * ) Notice: Subject to any disclaimer, the term of this patent is extended or adjusted under 35 U.S.C. 154(b) by 318 days.

(21) Appl. No.: 10/809,026

(22) Filed: Mar. 25, 2004

(51) Int. Cl.
 *F26B 3/30* (2006.01)
(52) U.S. Cl. ...................................... 392/411; 392/418
(58) Field of Classification Search ................ 392/411, 392/413, 415, 418, 422, 380, 382, 383; 264/492, 264/322; 425/174.4, 384, 388; 219/385, 219/521; 34/87, 91, 104
 See application file for complete search history.

(56) References Cited

U.S. PATENT DOCUMENTS

| | | | | |
|---|---|---|---|---|
| 2,090,371 A | * | 8/1937 | Marks | 34/87 |
| 2,622,180 A | * | 12/1952 | Hodges | 219/520 |
| 2,668,431 A | * | 2/1954 | Carlston | 68/5 R |
| 2,689,372 A | * | 9/1954 | Goulding, Jr. et al. | 425/384 |
| 3,085,350 A | * | 4/1963 | Waters | 34/91 |
| 3,188,752 A | * | 6/1965 | Skinner | 34/104 |
| 4,117,309 A | * | 9/1978 | Cayley | 219/385 |
| 4,529,109 A | * | 7/1985 | Manning | 223/52.1 |
| 4,818,849 A | * | 4/1989 | Matlen | 392/411 |
| 5,659,657 A | * | 8/1997 | Overdorf | 392/422 |
| 6,153,862 A | * | 11/2000 | Job | 219/521 |

\* cited by examiner

*Primary Examiner*—Thor Campbell
(74) *Attorney, Agent, or Firm*—Jerry Semer

(57) ABSTRACT

The device is a seat trim heater. It employs electric infrared lamps to heat the seat trim before the trim is placed over the frame and cushion material of the seat. The device consists of a basic frame on which the trim is placed. The frame is made from a series of adjustable fabricated parts. Within this frame are infrared heaters and reflectors. The reflectors can direct the infrared heat both to the front and back so that the whole seat trim can be heated. Integral to the system is the control box that controls the heating of the seat trim. The seat trim heater uses instant on/off T-3 quartz lamps. The control box consists of a control panel that is NEMA rated, a disconnect switch, appropriate fusing, a SCR and appropriate circuitry. Further, the control panel allows the heat to be infinitely variable.

19 Claims, 6 Drawing Sheets

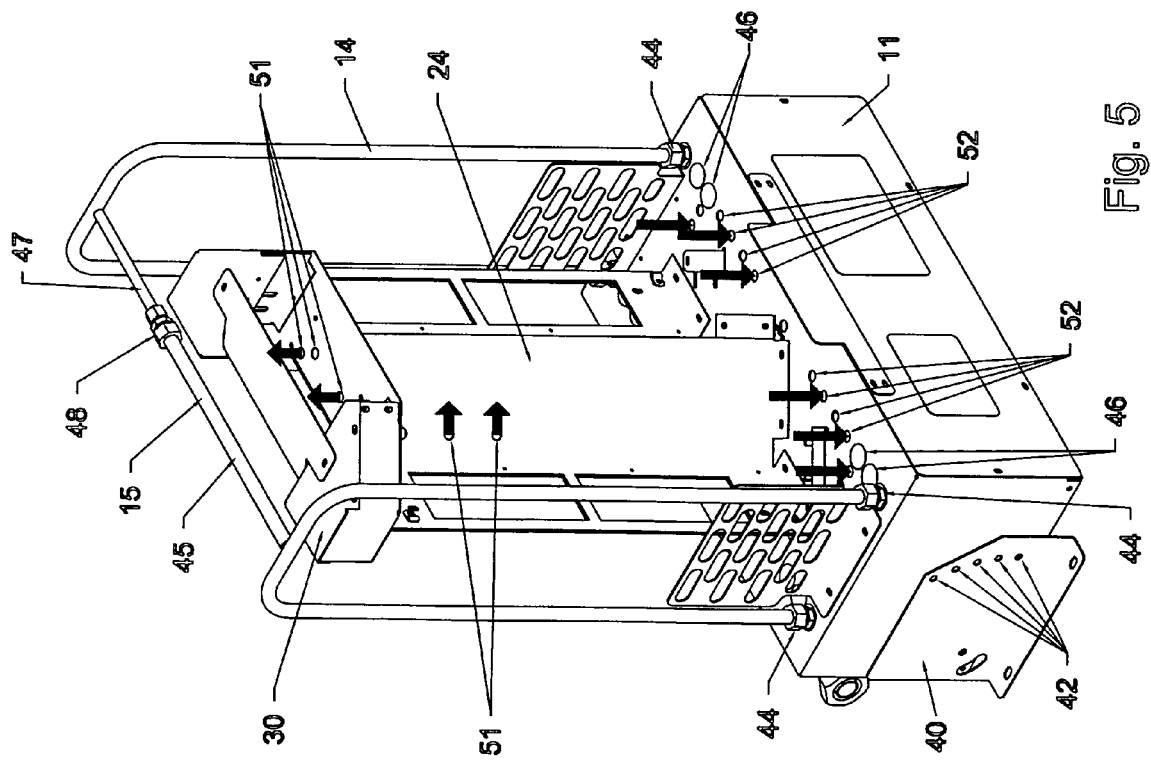

SEAT TRIM HEATER

FIELD OF INVENTION

This invention relates to the field of seat trim heaters and more particularly to infrared seat trim heaters.

BACKGROUND OF THE INVENTION

Most seat trims produced can be extremely hard to work with, especially if cold or even at room temperature. The trim is difficult to properly locate when worked into or over the seat frame and cushion material. In addition, many seat materials are cloth, vinyl or leather and contain wrinkles. The manufacturers of seats in the automobile industry have used heat, steam or a combination of both to relax the trim and make it more pliable and therefore make the seat trim much easier to work with during the installation over the seat frame, cushion or back. Manufacturers have also employed heat to de-wrinkle the material once it is placed in the seat frame, thereby making it more aesthetically pleasing and professional in appearance. The heating of the seat trim also allows for the trim to better conform to the frame and cushion. The method most often used in the automobile industry during the manufacture of seats is to employ large ovens in the final stage of production to de-wrinkle and relax the fabric after installation. One of the objectives of this invention is, however, to heat the seat trim before it is placed over the frame and cushion material to allow the individual installer to have a more relaxed and pliable trim, making his job much easier. Another object of this invention is to not use large ovens that heat the seat material before it goes to the individual workers for placing it on the cushion and frame material, but to heat the material right at the individual work station. This allows for the infrared heater to be much smaller and less expensive to make, use and maintain. This smaller seat trim heater also saves energy and time. If the heater is right at the workstation, the individual worker can place the seat trim over the heater, heat it and place it directly on the seat. If the seat trim has to be heated in a large oven before it is delivered to the workstation, there is the extra requirement of time to move the seating material from the ovens to the worker and back to the ovens. Also, the small trim heater will use less energy since the energy is focused directly at the seat trim, whereas in a large oven several seat trims must be heated together. This smaller seat trim heater is also the most practical, since seat trims cannot be heated prior to shipping to the work station, and since the seat trims cannot be heated after they have been placed over the frame and cushion material. The small seat trim heater at the workstation also saves space versus the large ovens.

SUMMARY OF THE INVENTION

The invention is a seat trim heater. It employs electric infrared lamps to heat the seat trim before the trim is placed over the frame and cushion material of the seat. The invention consists of a basic frame on which the trim is placed. The frame is made from a series of adjustable fabricated parts. Within this frame are infrared heaters and reflectors. The reflectors can direct the infrared heat both to the front and back so that the whole seat trim can be heated. Integral to the system is the control box that controls the heating of the seat trim. The seat trim heater uses instant off/on T-3 quartz lamps. The control box consists of a control panel that is NEMA rated, a disconnect switch, appropriate fusing, a SCR and appropriate circuitry. Further, the control panel allows the heat to be infinitely variable.

BRIEF DESCRIPTION OF THE DRAWINGS

FIG. 5 is a perspective view of the invention with the guard and lamps removed showing the airflow.

DETAILED DESCRIPTION OF THE PREFERRED EMBODIMENT

Figure 1:
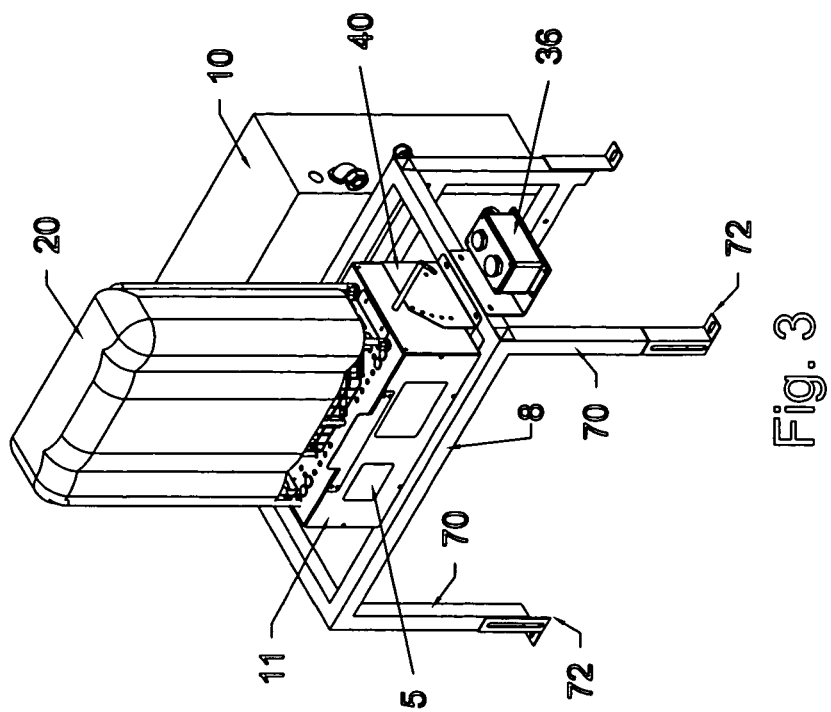
FIG. 1 is a perspective view of one embodiment of the invention
Figure 3:
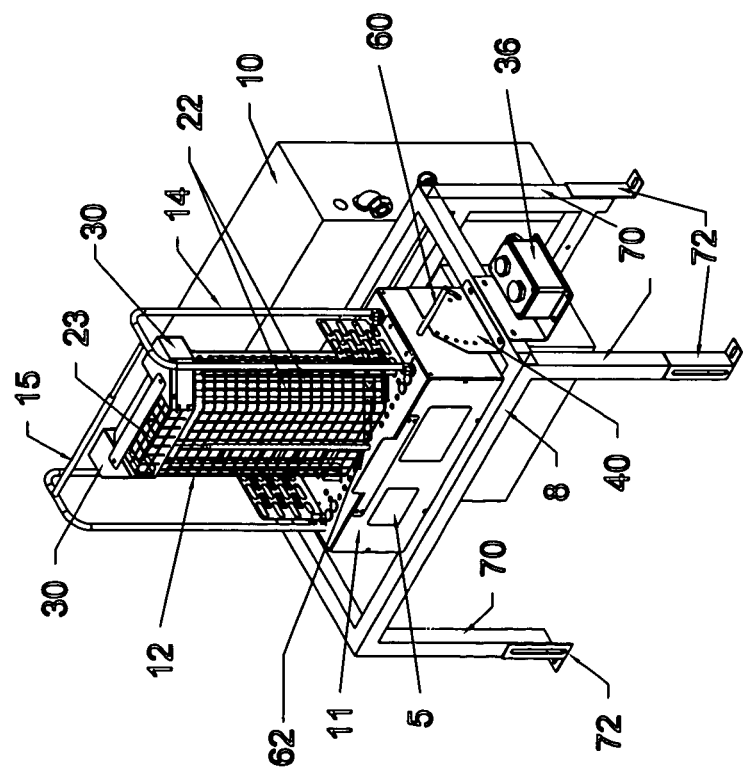
FIG. 3 is a perspective view of the invention with the seat trim placed over the invention.
Figure 2:
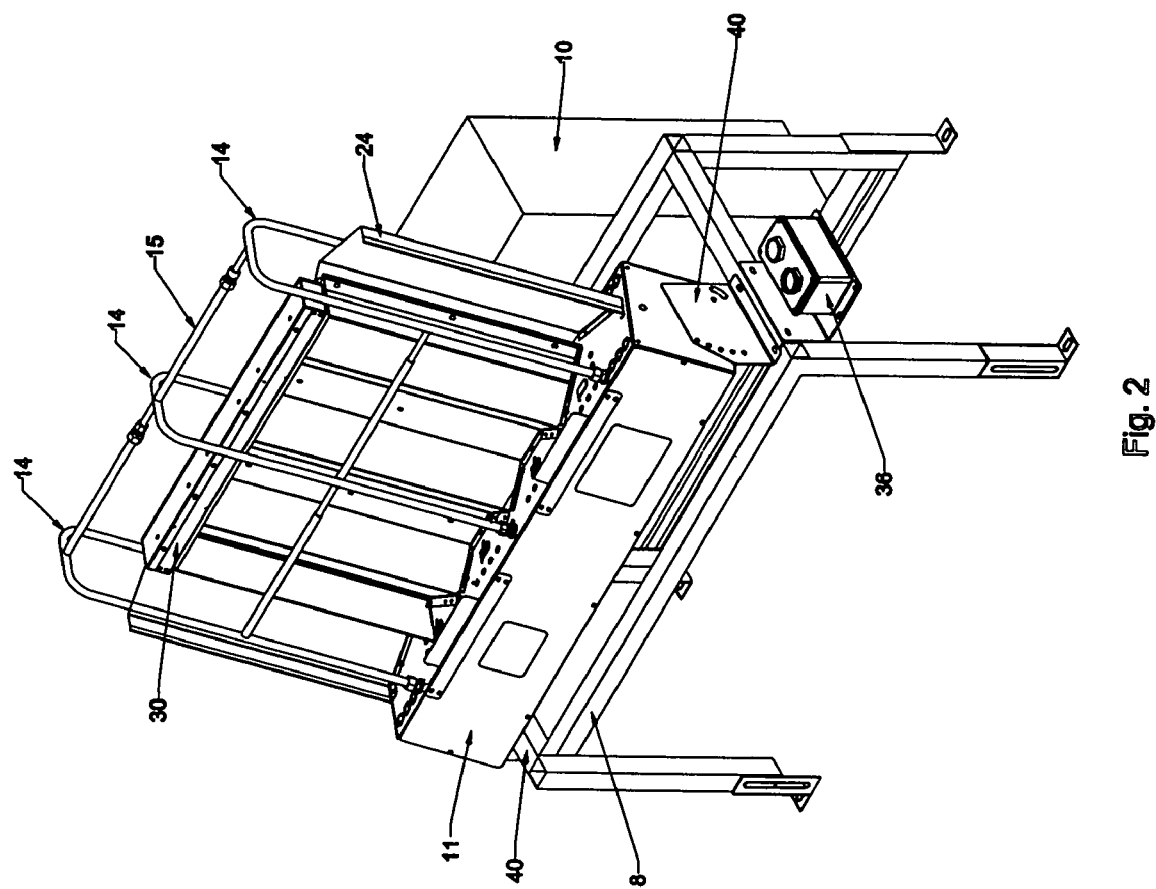
FIG. 2 is a perspective view of another embodiment of the invention

FIG. 1 shows the control box 10, the base housing 11, the guard structure 12 and the frame units 14. In FIG. 1 there are two frame units 14. These frame units 14 are U-shaped in a smoothly curved U. In FIG. 1 the frame units 14 are attached to the base housing 11 at each end of the base housing 11. This design is for a smaller or bucket type seat. For larger or bench type seats there would be a larger heater and more frame units 14 as shown in FIG. 2. Also, the frame units 14 could have frame supports 15 between the different U-shaped frame units 14 to make the structure more solid as shown in FIGS. 1 and 2. The frame units 14 are placed such that the seat trim 20 can be stretched over them as shown in FIG. 3. The frame units 14 are of sufficient strength to support the seat trim.

Frame unit 14 is also adjustable. In the preferred embodiment frame unit 14 is attached to base housing 11 by a set of conductors 44. From FIG. 5 one can see that this set of connectors 44 contains two connectors on each end for the two legs of frame unit 14. FIG. 5 also shows that in this embodiment there are a number of openings 46 for connectors 44 on each end of the base housing 11. The frame units' 14 legs can be placed in any one of these sets of openings 46 and thus the seat trim heater is adapted to take many sizes of seat trims. In addition, it is shown in FIG. 5 that the frame support 15 can be made adjustable. In this figure, frame unit 15 is shown as a tube 45 and a rod or tube 47 designed such that tube or rod 47 fits within tube 45. Thus, frame support 15 can be lengthened or shortened by moving tube or rod 47 in or out of tube 45. Connector 48 holds tube 45 and tube or rod 47 tightly in place.

Figure 4:
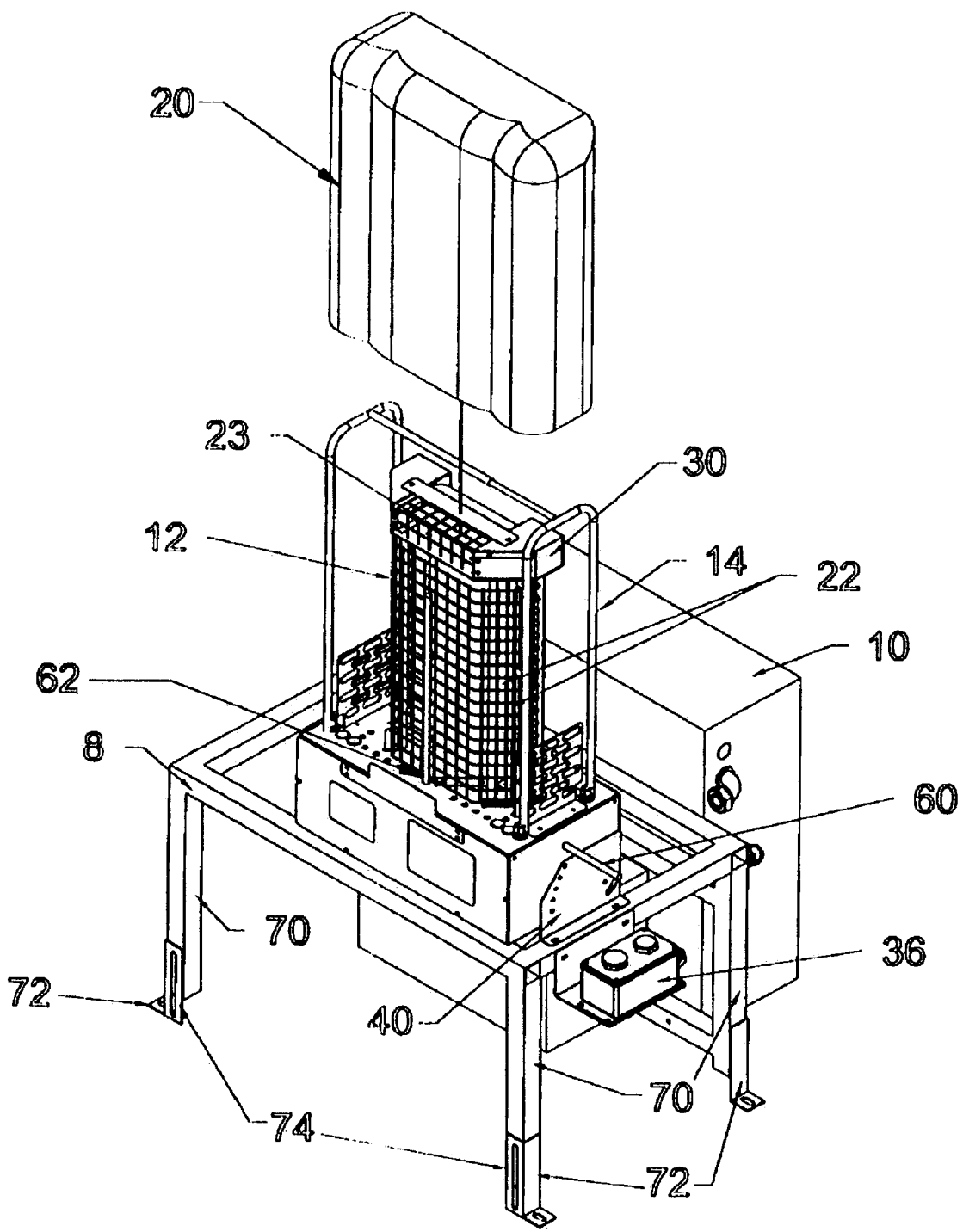
FIG. 4 is a perspective view of the invention with the seat trim exploded off.

FIG. 4 is an exploded view of the seat trim heater with the seat trim 20 exploded from the seat trim heater. As you can see from FIG. 4, the seat trim 20 covers most of the frame unit 14. Within the area created by the frame unit 14 lies the guard structure 12, the infrared lamps 22 and 23, and the reflector 24. The reflector 24 best seen in FIG. 5, is attached to the base housing 11 and is a structure that lies in the center of the area marked out by the frame units 14. The reflectors 24 are made out of highly reflective aluminum. The reflectors direct the infrared heat from the infrared lamps 22 and 23. The reflector unit 24 also provides support for the infrared lamps 22 and 23. An infrared lamp 23 can be placed at the top of the reflector unit 24 and radiate its heat out toward the top of the seat trim 20. Other infrared lamps 22 in the preferred embodiment can be placed near the end of the area framed out by frame unit 14 and their heat is radiated out towards the front, back and sides of the seat trim 20. In the preferred embodiment, the infrared lamps 22 and 23 are quartz T-3 instant on/off lamps. These infrared lamps 22 and 23 were picked since they go on and off instantly, thus saving time for the operator since there is no warm up time required. A top piece 30 holds the top infrared lamp 23 and the reflector unit 24 in place. The other infrared lamps 22 run from the base housing 11 up to the top piece 30 and they are held in place by both the base housing 11 and the top piece 30. Around this whole structure of infrared lamps 22 and 23, reflector 24, and top piece 30 is placed a guard structure 12. The guard structure 12 is designed to protect the infrared lamps 22 and 23 and the operator of the heater. The guard structure 12 ensures that the operator does not make contact with the infrared lamps 22 and 23. The guard structure fits within the area framed out by the frame units 14.

FIG. 4 and FIG. 1 show the steam ports 60 and 62. Both steam ports 60 and 62 extend out from the base unit. Steam ports 60 extend from the side end of the base housing 11. Steam port 60 is a small pipe that extend out from the end of the base housing 11. Steam port 62 is a small perforated pipe that extends out of the top of the base housing 11 in front of the guard structure 14. These steam ports 60 and 62 allow steam to be used to heat the outside or the seat trim 20 and make it more pliable The steam for the steam ports is provided by a source outside the unite.

Figure 7:
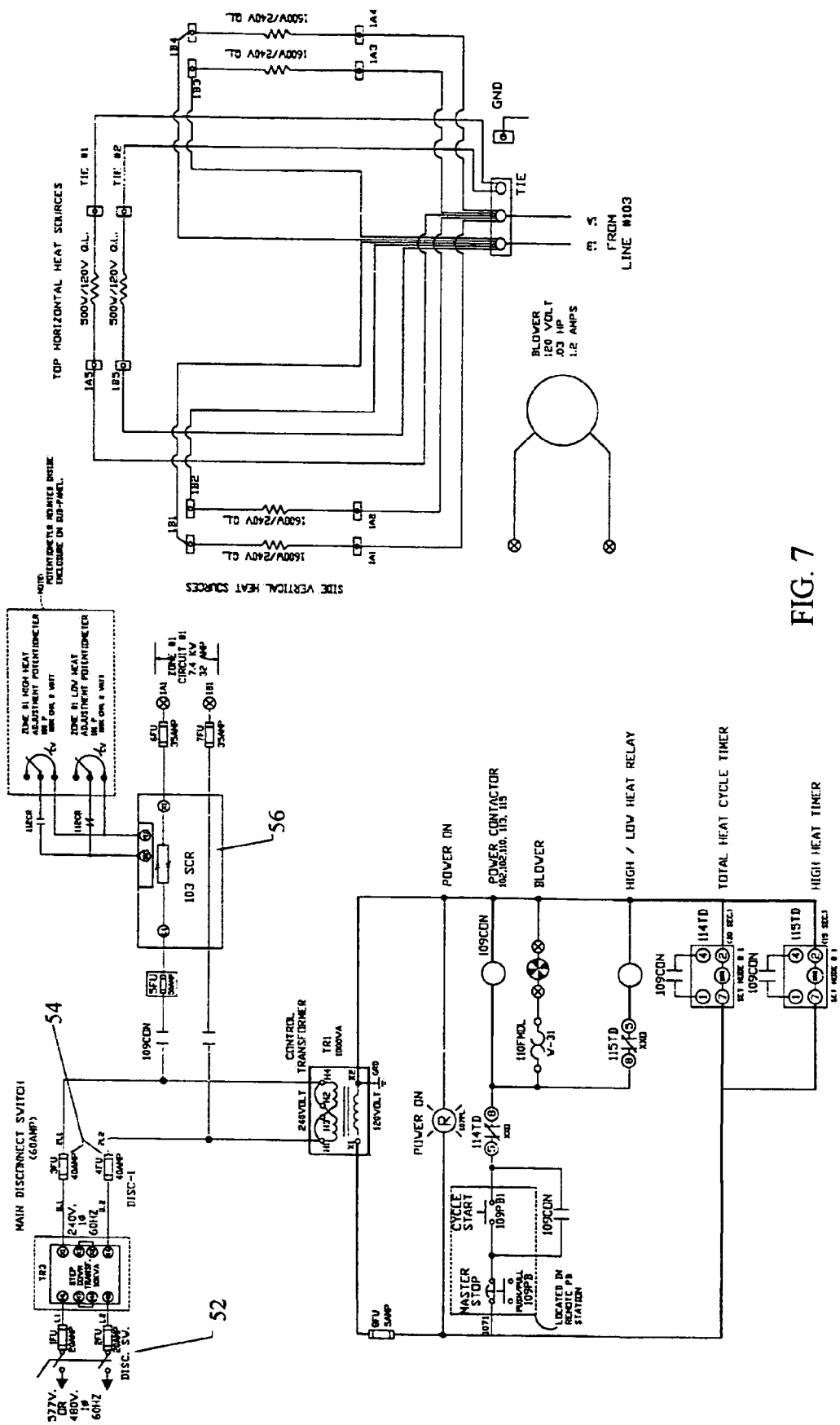
FIG. 7 is a wiring diagram of the invention

The control box 10 controls the heat output of the lamp. The control box 10 is NEMA rated. Control box 10 contains appropriate fusing, circuitry and an SCR and allows for heat from the lamps to be infinitely variable. FIG. 7 shows the circuitry within the control box 10 in the preferred embodiment. In this embodiment the seat trim heater can be wired to an electrical source that is either 240, 480 or 577 volts at 60 cycles AC. A main disconnect switch 52 is designed into the circuit to ensure that the seat trim heater can be turned off immediately for safety reasons. Fuses 54 are also added for safety precautions. Electricity flows to the infrared lamps through a silicon controlled rectifier 56. Electric also flows to the control circuits that time the heater and control the amount of power that reaches the lamps, by controlling the silicon controlled rectifier 56. Also, the circuitry can be designed for a timer, or a more sophisticated PLC system that fully regulates the heat output and time. Beside the control box 10 sits the on/off push button safety switch 36.

As shown in FIGS. 1 and 2, the control box 10 with on/off push button safety switch 36 and the heat unit 5, which contains the housing 11, the guard structure 12, and frame units 14, the infrared lamps 22 and the reflectors 24; are attached to a stand 8. The control box 10 is attached to the stand 8 and the heat unit 5 is pivotally attached to the top of the stand 8. The heat unit 5 is pivotally attached to the top of stand 8 so that the worker at the work station can choose the most convenient angle to place the seat trim on the unit and subsequently remove the trim. In FIG. 2 it is shown that on top of the stand 8 are two wings 40. These wings 40 are attached to the top of the stand 8. On the front side of the wing 40 there is a set of holes 42 that curve towards the back of the stand 8. The heat unit 5 is pivotally attached to the stand 8 at the bottom back corners of the heat unit 5. This allows the heat unit to be angled. The worker at the seat trim heater can pivot the heat unit 5 to the desired position. Then he places a pin through one of the holes in the set of holes 42 which lines up with opening on the side of the heat unit 5 at the bottom front corner. Another pin is placed through one of the holes in the set of holes 44, which lines up with opening on the other side of the heat unit 5. This holds the heat unit 5 securely in place at the most convenient angle.

The legs 70 of the stand 8 are also adjustable. FIGS. 1, 2, 3, and 4 show the adjustable legs 70. The worker thus can adjust the heights of stand 8 and choose the most convenient height to place the seat trim on the unit and subsequently remove the trim. An adjustable piece is placed on each leg 70. This adjustment piece 72 has a slot 74. In leg 70 there is an treated opening in which a bolt fits. The bolt is designed to fit through the slot. The worker moves the stand 8 to the best height and tightens the bolt on each leg 70 against the adjustment piece 72. This holds the stand 8 a the selected height.

Figure 6B:
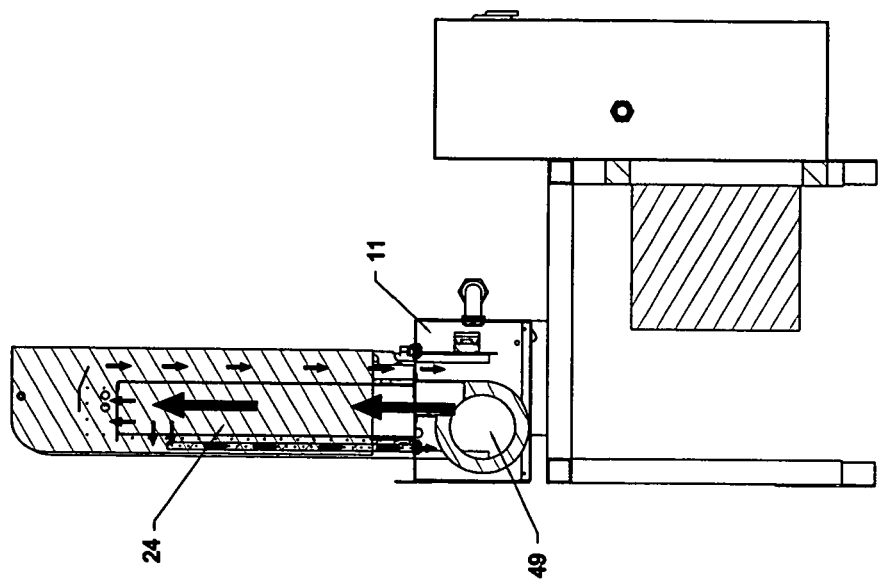
FIG. 6B is a sectional view of the invention along line a-a of FIG. 6A.
Figure 6A:
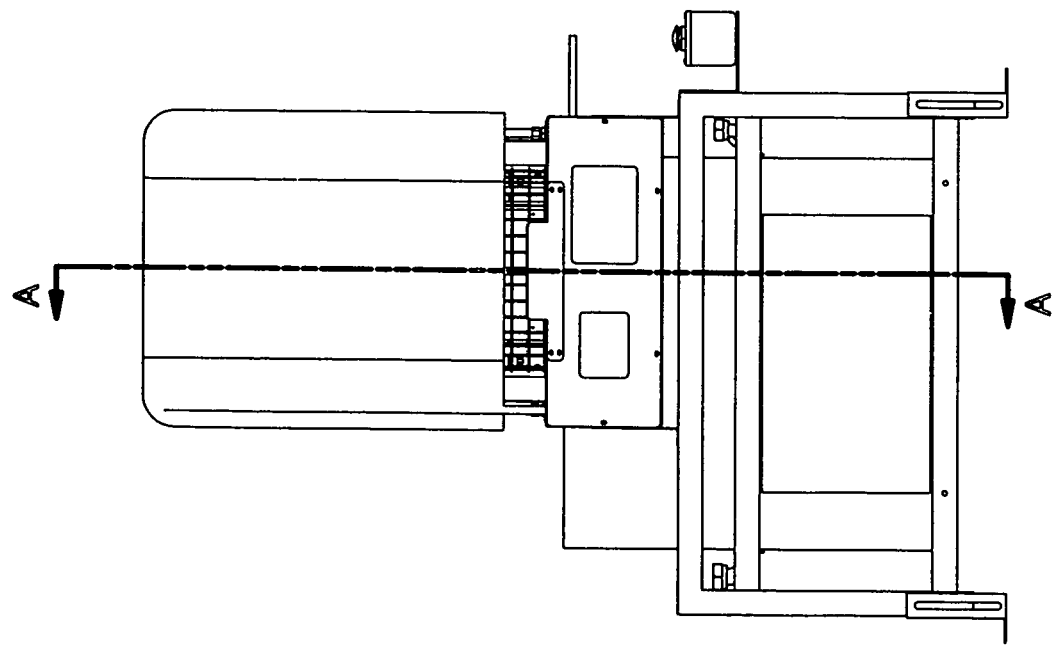
FIG. 6A is a front view of the invention with the seat trim placed over the invention.

FIGS. 6A and 6B shows a cutaway view of the seat trim heater. FIG. 6B shows that in base housing 11, a fan 49 is placed to blow air up through reflector unit 24. Reflector unit 24 is shown in FIG. 6a to be hollow and fan 49 blows air up through reflector unit 24. Reflector unit 24 also has perforations 51 which allows the air to escape as shown in FIG. 5. The air returns to the base unit 11 through perforations 52. Reflector unit becomes hot when the infrared lights are turned on. Thus, the air flowing from the fan 49 is warmed by moving up through the hollow of reflector unit 24 and it escapes through the perforations 51 heats the seat trim 10. FIG. 5 shows how the air flows out from the reflector unit 24 through perforations 52 and returns through perforations 52 in the base unite 11.

The seat trim heater is placed at the operator's workstation. To use the seat trim heater, the operator takes a seat trim 20 and stretches it over the frame unit 14. The operator then switches the on/off switch 36 which turns on the infrared lamps 22 which immediately begin heating the seat trim 20 and sets the timer 34. When the timer 34 turns off the infrared lamps 22, the operator removes the heated seat trim from the frame unit 14 and begins to place the seat trim 20 over the frame and cushion of the seat. Since the seat trim 20 is heated, the operator can stretch the seat trim 20 more easily over the seat. Also the seat trim 20 will fit better and with fewer wrinkles. Heating the seat trim allows the operator to make a better product.

Changes and modifications in the specifically described embodiments can be carried out without departing from the scope of the invention which is intended to be limited only by the scope of the appending claims.

I claim:

1. A trim heater designed to heat a seat trim comprising:
   a. a base; and,
   b. an open frame made out of smoothly curved tubing that allows air and infrared heat to pass through said frame attached to the top of the base and said frame is approximately the height, width, and length of a portion of a vehicle seat that the seat trim will cover and said frame is adapted such that the seat trim can be stretched tightly over the frame; and,
   c. a heater attached to the top of the base and adapted to fit within the frame and said heater directs heat toward the top, sides, front, and back of the seat trim that encircles the heater; and,
   d. a means designed to deliver power to the heater from an outside source; and,
   e. a switch designed to allow a operator of the trim heater to turn on and off the heater; and
   f. whereas the seat trim is stretched over the frame and the operator turns on a switch which allows power to flow to the heater and heat the trim.

2. The trim heater designed to heat a seat trim as in claim 1 wherein:
   a. the heater is a set of infrared lamps.

3. A trim heater designed to heat a seat trim as in claim 2 further comprising;
   a. a reflector to reflect the infrared heat towards the trim and said reflector is attached to the base and is within the frame and said infrared lamps and reflector is locate such that it directs the infrared heat upward towards the top of the seat trim and outward towards the sides and the front and back of the seat trim.

4. The trim heater designed to heat a seat trim as in claim 3 wherein:
   a. a guard protects the reflector and infrared lamps.

5. A trim heater designed to heat a seat trim as in claim 1 further comprising:
   a. a stand with a top; and,
   b. a means of attaching the base, with the heater and the frame mounted to the base's top, to the top of the stand.

6. A trim heater designed to heat a seat trim as in claim 5 wherein:
   a. a means for attaching the base to the stand is a pivotal attachment means.

7. A trim heater designed to heat a seat trim as in claim 6 wherein:
   a. the means for attaching the base to the stand comprises:
      1. wings attached to the stand; and,
      2. the front corners of the base are pivotally attached to the stand;
      3. openings in a quarter circle pattern on the wings; and,
      4. a hole on each side of the base that aligns with the openings in the wings; and,
      5. a pin that is adapted to fit through the openings in the wings and the hole in each side of the base; and,
      6. whereas the base with heater is slanted to a position that an opening in each wing aligns with the hole in each side of the base and a pin is placed into the opening and the hole to hold the base in place.

8. A trim heater designed to heat a seat trim as in claim 4 further comprising:
   a. a stand with a top; and,
   b. a means of attaching the base with the heater and the frame mounted to the base's top, to the top of the stand.

9. A trim heater designed to heat a seat trim as in claim 8 wherein:
   a. a means for attaching the base to the stand is a pivotal attachment means.

10. A trim heater designed to heat a seat trim as in claim 1 further comprising:
   a. a means for controlling the amount of power that reaches the heater.

11. A trim heater designed to heat a seat trim as in claim 1 further comprising:
   a. a means for controlling the interval of time the power reaches the heater.

12. A trim heater designed to heat a seat trim as in claim 10 further comprising:
   a. a means for controlling the interval of time the power reaches the heater.

13. A trim heater designed to heat a seat trim as in claim 9 wherein:
   a. the amount of power and the interval of time can be varied infinitely.

14. A trim heater designed to heat a seat trim as in claim 1 further comprising:
   a. an inlet adapted to attach to a source of steam; and,
   b. steam ports that extend out from the base that are designed to direct the steam from the source of steam to heat and moisten the seat trim.

15. A trim heater designed to heat a seat trim as in claim 1 further comprising:
   a. a fan that is located in the base that blows air that is warmed by the heater against the seat trim.

16. A trim heater designed to heat a seat trim as in claim 15 wherein:
   a. the reflector is heated by the heater; and,
   b. the reflector is hollow and the fan blows air into the hollow reflector and the air is warmed by it's passage through the reflector; and,
   c. the reflector has outlets that direct the air towards the seat trim.

17. A trim heater designed to heat a seat trim as in claim 16 wherein:
   a. the base has inlets that allow the air that the fan blows through the hollow reflector and through the reflector's outlets towards the seat trim to return to the fan.

18. A trim heater designed to heat a seat trim comprising:
   a. a base; and,
   b. an open frame that allows air and infrared heat to pass through said frame attached to the top of the base and adapted such that the seat trim can be stretched tightly over the frame; and,
   c. a heater attached to the top of the base and adapted to fit within the frame; and,
   d. a means designed to deliver power to the heater from an outside source; and,
   e. a switch designed to allow a operator of the trim heater to turn on and off the heater; and
   f. a fan that is located in the base that blows air that is warmed by the heater against the seat trim; and,
   g. whereas the trim is placed over the frame and the operator turns on a switch which allows electric to flow to the heater and heat the trim;
   h. the reflector is heated by the heater; and,
   i. the reflector is hollow and the fan blows air into the hollow reflector and the air is warmed by it's passage through the reflector; and,
   j. the reflector has outlets that direct the air towards the seat trim.

19. A trim heater designed to heat a seat trim as in claim 18 wherein:
   a. the base has inlets that allow the air that the fan blows through the hollow reflector and through the reflector's outlets towards the seat trim to return to the fan.

* * * * *